(12) United States Patent
Peng et al.

(10) Patent No.: US 11,907,554 B2
(45) Date of Patent: Feb. 20, 2024

(54) CONTROLLING STARTUP OF HARD DISK DRIVE (HDD) BY LOCKING INITIALIZATION OF SMALL COMPUTER SYSTEM INTERFACE (SCSI) STATE(S) USING AN OUT-OF-BAND (OOB) NEGOTIATION PROCESS

(71) Applicant: INSPUR SUZHOU INTELLIGENT TECHNOLOGY CO., LTD., Jiangsu (CN)

(72) Inventors: Yunwu Peng, Jiangsu (CN); Yu Zou, Jiangsu (CN); Xuezong Yang, Jiangsu (CN); Hui Tian, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/012,423

(22) PCT Filed: Feb. 23, 2021

(86) PCT No.: PCT/CN2021/077361
§ 371 (c)(1),
(2) Date: Dec. 22, 2022

(87) PCT Pub. No.: WO2022/012047
PCT Pub. Date: Jan. 20, 2022

(65) Prior Publication Data
US 2023/0214140 A1   Jul. 6, 2023

(30) Foreign Application Priority Data
Jul. 14, 2020   (CN) .......................... 202010676254.0

(51) Int. Cl.
G06F 3/06        (2006.01)

(52) U.S. Cl.
CPC .......... *G06F 3/0632* (2013.01); *G06F 3/0604* (2013.01); *G06F 3/0676* (2013.01)

(58) Field of Classification Search
CPC ..... G06F 3/0632; G06F 3/0604; G06F 3/0676
See application file for complete search history.

(56) References Cited

U.S. PATENT DOCUMENTS 7,472,211 B2 * 12/2008 Kawai .................. G11B 33/125
                                                              711/170
8,112,564 B2 *  2/2012 Duerk ................... G06F 1/3268
                                                              710/62

(Continued)

FOREIGN PATENT DOCUMENTS

CN       106774801 A      5/2017
CN       107066418 A      8/2017

(Continued)

OTHER PUBLICATIONS

International search report for PCT/CN2021/077361 dated May 27, 2021.

(Continued)

*Primary Examiner* — Tammara R Peyton
(74) *Attorney, Agent, or Firm* — Dennemeyer & Associates LLC; Victoria Friedman (57) ABSTRACT

A method and apparatus for controlling startup of a hard disk drive system, and a storage device. The hard disk drive system includes two or more hard disk drives. The method for controlling startup of a hard disk drive system includes: latching the initialization states of all the hard disk drives after all hard disk drives are powered on; dividing all hard disk drives into two or more hard drive groups, each hard drive group includes more than one hard disk drive; sequentially perform link initialization negotiation on each hard drive group by using a port protocol; and in an OOB negotiation process of the link initialization negotiation, by (Continued)

setting the state of an SCSI application layer power state machine, control a motor of each hard disk drive in the hard drive group to enter a spinning state.

20 Claims, 3 Drawing Sheets

(56) References Cited

U.S. PATENT DOCUMENTS

| | | | |
|---|---|---|---|
| 8,327,166 B2 * | 12/2012 | Day | G06F 1/3221 |
| | | | 713/340 |
| 2012/0137113 A1 | 5/2012 | Qi et al. | |

FOREIGN PATENT DOCUMENTS

| | | |
|---|---|---|
| CN | 107209712 A | 9/2017 |
| CN | 107402623 A | 11/2017 |
| CN | 110147157 A | 8/2019 |
| CN | 111142644 A | 5/2020 |
| CN | 111880728 A | 11/2020 |

OTHER PUBLICATIONS

Search report for Chinese application 202010676254.0, filed Jun. 14, 2020.

\* cited by examiner

Fig. 4

CONTROLLING STARTUP OF HARD DISK DRIVE (HDD) BY LOCKING INITIALIZATION OF SMALL COMPUTER SYSTEM INTERFACE (SCSI) STATE(S) USING AN OUT-OF-BAND (OOB) NEGOTIATION PROCESS

CROSS-REFERENCE TO RELATED APPLICATIONS

This is a 35 U.S.C. 371 National Stage Patent Application of International Application No. PCT/CN2021/077361, filed Feb. 23, 2021, which claims priority to Chinese application 202010676254.0, filed Jun. 14, 2020, each of which is hereby incorporated by reference in its entirety.

TECHNICAL FIELD

The present disclosure relates to the field of computer technologies, and in particular, to a method and apparatus for controlling startup of a hard disk drive system, and a storage device.

BACKGROUND

Hard disks are divided into hard disk drives (HDD) and solid state disks (SSD). A hard disk drive is a traditional common hard disk, and mainly includes such as a disc, a magnetic head, a rotating shaft, a motor, a magnetic head controller and a data converter, etc. A hard disk drive uses a magnetic disk as a data storage medium; a magnetic head can move along a radial direction of a disk; in addition, a motor controls the disk to spin at a high speed, so that the magnetic head can be positioned at a designated position of the disk to realize data read and write operations. A single 3.5-inch hard disk drive consumes about 8-12 W of power consumption during normal operation.

However, during the startup of the hard disk drive, due to the spin up of the motor, the power consumption of a single disk is large, which can reach 20-35 W.

A hard disk drive system of a storage device such as a storage server or a storage array system generally includes 12-72 3.5-inch hard disk drives. If it is a hard disk drive system includes 36 hard disk drives and the 36 hard disk drive drives are started simultaneously, the power consumption of the hard disk drive system during the startup period exceeds 900 W, and the power consumption during the normal working period is about 324 W; if it is a hard disk drive system includes 72 hard disk drives and the 72 hard disk drives are started simultaneously, the power consumption of the hard disk drive system during the startup period exceeds 1800 W, while the power consumption during the normal working period is about 650 W. In order to ensure the normal startup of the storage device and the hard disk drive system, a power supply module with a high load power needs to be selected. However, when the hard disk drive system works normally, there is no high requirement on the load power of the power module. Furthermore, the design of a power supply module of a storage device is usually redundant, and a power supply module with a large load power is selected. In addition to high cost of the power supply module itself, there is also a problem of low conversion efficiency of each power supply module when a redundant power supply module is normally used. In order to solve the problem that power consumption is relatively large due to the spin up of the motor when a plurality of hard disk drives are started at the same time, in the prior art, an electric fuse (Efuse) is added to each hard disk drive, a complex programmable logic device (CPLD) or a baseboard management controller (BMC) is used to control the connection and disconnection of a power source of the Efuse, the Efuses of a group of hard disk drives are first powered on, and after completion of the spin up of the motor of the group of hard disk drives, the Efuses of the next group of hard disk drives are then powered on, so that staggered startup in batches of a hard disk drive system is realized, thereby selecting a power source module with an appropriate load power and reducing device cost. However, adding an Efuse to each hard disk drive increases costs and a failure rate of a hard disk backplane, furthermore, if a certain Efuse fails, the hard disk drive of a certain slot cannot be started, the hard disk backplane needs to be replaced, and the maintenance cost is increased.

SUMMARY

The problems to be solved by the present disclosure is high cost of the existing solution of staggered startup in batches of a plurality of hard disk drives, high failure rate of the hard disk backplane and high maintenance cost.

The present disclosure is implemented by the following technical solutions:

a method for controlling startup of a hard disk drive system, the hard disk drive system includes two or more hard disk drives, wherein the method for controlling startup of a hard disk drive system includes:

latching the initialization states of all the hard disk drives after all hard disk drives are powered on;

dividing all hard disk drives into two or more hard drive groups, each hard drive group includes more than one hard disk drive; and sequentially performing link initialization negotiation on each hard drive group by using a port protocol; and in an Out-Of-Band (OOB) negotiation process of the link initialization negotiation, controlling a motor of each hard disk drive in the hard drive group to enter a spinning state by setting a state of an SCSI application layer power state machine.

In an embodiment, the state of a Small Computer System Interface (SCSI) application layer power state machine includes a Powered_On state, an Active state, an Idle state, a Standby state, a Stopped state, an Active_Wait state and an Idle_Wait state;

latching the initialization states of all the hard disk drives includes:

setting the state of the SCSI application layer power state machine as an Idle state by means of the firmware in a Serial Attached SCSI (SAS) port control chip or an SAS port expansion chip.

In an embodiment, dividing all hard disk drives into two or more hard drive groups includes:

dividing all hard disk drives into at least two hard drive groups by using firmware in the SAS port control chip or the SAS port expansion chip.

In an embodiment, performing link initialization negotiation on each hard drive group includes:

sequentially performing an OOB negotiation, a Speed negotiation, a Phy reset operation and a Link reset operation on the hard drive group.

In an embodiment, in an OOB negotiation process of the link initialization negotiation, by setting the state of an SCSI application layer power state machine, controlling a motor of each hard disk drive in the hard drive group to enter a spinning state includes:

performing a first OOB negotiation on the hard drive group;

after the first OOB negotiation ends, setting the state of the SCSI application layer power state machine as an Active state by means of the firmware in an SAS port control chip or an SAS port expansion chip; and performing a second OOB negotiation on the hard drive group;

wherein the OOB negotiation may include:

sending a first COMINIT signal to the hard drive group to receive a second COMINIT signal returned by the hard drive group;

after receiving a second COMINIT signal returned by the hard drive group, sending a COMSAS signal to the hard drive group to receive a third COMINIT signal returned by the hard drive group; and after receiving a third COMINIT signal returned by the hard drive group or after a preset time, sending a COM-WAKE signal to the hard drive group.

Based on the same inventive concept, the present disclosure further provides an apparatus for controlling startup of a hard disk drive system, wherein the hard disk drive system includes two or more hard disk drives, and the apparatus for controlling startup of a hard disk drive system includes:

a latching module, configured to latch the initialization states of all the hard disk drives after all hard disk drives are powered on;

a grouping module, configured to divide all hard disk drives into two or more hard drive groups, each hard drive group includes more than one hard disk drive; and a negotiation module, configured to sequentially perform link initialization negotiation on each hard drive group by using a port protocol; and in an OOB negotiation process of the link initialization negotiation, by setting the state of an SCSI application layer power state machine, control a motor of each hard disk drive in the hard drive group to enter a spinning state. Based on the same inventive concept, the present disclosure further provides a storage device, the storage device includes a Central Processing Unit (CPU), an SAS port control chip and a hard disk drive system, the hard disk drive system includes two or more hard disk drives, and the SAS port control chip is configured to:

latch the initialization states of all the hard disk drives after all hard disk drives are powered on;

divide all hard disk drives into two or more hard drive groups, each hard drive group includes more than one hard disk drive; and sequentially perform link initialization negotiation on each hard drive group by using a port protocol; and in an OOB negotiation process of the link initialization negotiation, by setting the state of an SCSI application layer power state machine, control a motor of each hard disk drive in the hard drive group to enter a spinning state.

Based on the same inventive concept, the present disclosure further provides another storage device, the storage device includes a CPU, an SAS port control chip, an SAS port expansion chip and a hard disk drive system, the hard disk drive system includes two or more hard disk drives, wherein the SAS port expansion chip is configured to:

latch the initialization states of all the hard disk drives after all hard disk drives are powered on;

divide all hard disk drives into two or more hard drive groups, each hard drive group includes more than one hard disk drive; and sequentially perform link initialization negotiation on each hard drive group by using a port protocol; and in an OOB negotiation process of the link initialization negotiation, by setting the state of an SCSI application layer power state machine, control a motor of each hard disk drive in the hard drive group to enter a spinning state.

In an embodiment, the hard disk drive is a hard disk drive with a Serial Advanced Technology Attachment (SATA) port or an SAS port.

Based on the same inventive concept, the present disclosure further provides a computer readable storage medium, wherein a computer program is stored on the storage medium, and when the computer program is executed by a processor, the steps of the method for controlling startup of a hard disk drive system is implemented.

Compared with the related art, the present disclosure has the following advantages and beneficial effects:

the present disclosure provides a method and apparatus for controlling startup of a hard disk drive system, and a storage device, and includes dividing all hard disk drives in the hard disk drive system into two or more hard drive groups, sequentially performing link initialization negotiation on each hard drive group by using a port protocol; and in an OOB negotiation process of the link initialization negotiation, by setting the state of an SCSI application layer power state machine, controlling a motor of each hard disk drive in the hard drive group to enter a spinning state. Due to staggered startup in batches of hard disk drives in the hard disk drive system, a power supply module with an appropriate load power can be selected, thereby reducing device cost. For example, for a 4U36 disk storage server, a power supply module with a load power of 800 W may be selected to replace a power supply module with a load power of 1200 W, which not only reduces system cost, but also improves conversion efficiency of a redundantly designed power supply module, thereby reducing the operation cost of a user. Furthermore, the method and apparatus for controlling startup of a hard disk drive system, and the storage device provided in the present disclosure realize, in a software manner, staggered power-on in batches of hard disk drives, without adding isolation devices such as an electric fuse or a transistor, thereby reducing the costs of a hard disk backplane, reducing the failure rate of the hard disk backplane, reducing the probability of replacement of a hard disk backplane, and also reducing the operation and maintenance cost.

BRIEF DESCRIPTION OF THE DRAWINGS

The drawings illustrated herein are used for providing further understanding of the present disclosure, and constitute a part of the present disclosure, but do not limit the embodiments of the present disclosure. In the drawings.

DETAILED DESCRIPTION OF THE EMBODIMENTS

To make the objectives, technical solutions, and advantages of the present disclosure clearer, hereinafter, the present disclosure is further described in detail in combination with the embodiments and the accompanying drawings; and illustrative embodiments of the present disclosure and illustrations thereof are used for explaining the present disclosure, rather than constitute limitations on the present disclosure.

Figure 1:
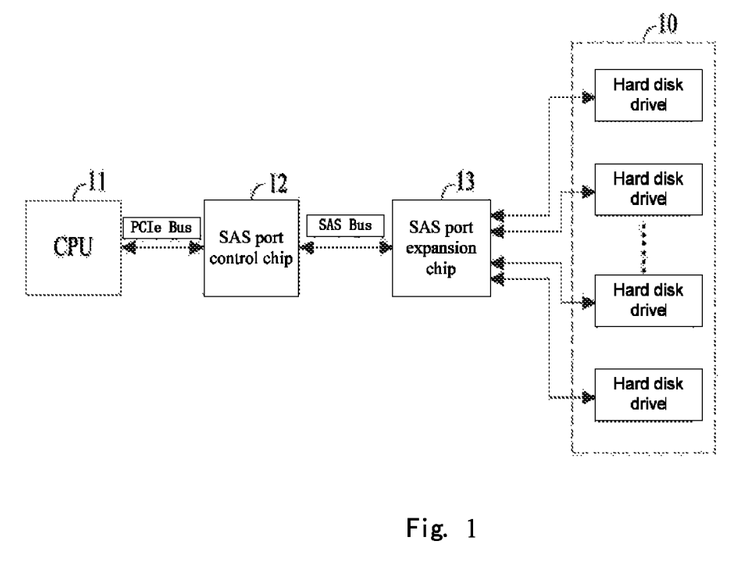
FIG. 1 is a schematic structural diagram of a storage device according to an embodiment of the present disclosure.

The embodiments of the present disclosure provide a method for controlling startup of a hard disk drive system. The method for controlling startup of a hard disk drive system is applied to a storage device such as a storage server or a storage array system, and is used for controlling the staggered startup in batches of a hard disk drive system in the storage device. FIG. 1 is a schematic structural diagram of the storage device. The storage device includes a CPU 11, an SAS port control chip 12, an SAS port expansion chip 13, and a hard disk drive system 10. The hard disk drive system 10 includes two or more hard disk drives.

The CPU11 accesses the SAS port control chip 12 by means of a PCIe bus. The SAS port control chip 12 reads and writes a hard disk drive by means of the SAS bus. As the SAS port control chip 12 has fewer SAS ports, which are generally 8 to 16 SAS Phy ports and can have 8 to 16 hard disk drives, the SAS port expansion chip 13 is used to extend the port of the SAS port control chip 12, and 24 to 68 SAS Phy ports can be supported. Each SAS Phy port of the SAS port expansion chip 13 may be connected to a hard disk drive, for example, for a 4U 36-bay storage server, the SAS port expansion chip 13 has 48 SAS Phy ports, eight SAS Phy ports in the uplink are connected to the SAS port control chip 12, and 36 SAS Phy ports in the downlink can have 36 hard disk drives.

As the SAS port is downward compatible with the SATA port, a hard disk drive connected to the SAS port expansion chip 13 may be a hard disk drive with an SATA port or an SAS port, that is, the hard disk drive system 10 includes more than two hard disk drives with an SATA port or an SAS port.

Further, the hard disk drive may be in the size of 3.5 inches.

Figure 2:
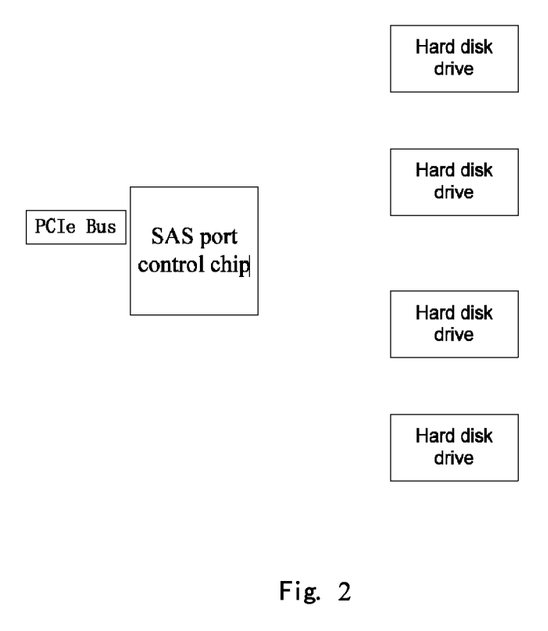
FIG. 2 is a schematic structural diagram of a storage device according to another embodiment of the present disclosure.

It should be noted that, in some application scenarios where the amount of stored data is small, the port of the SAS port control chip 12 does not need to be extended. As shown in FIG. 2, the SAS port control chip 12 is directly connected to each hard disk drive in the hard disk drive system 10 by means of an SAS bus. The method for controlling startup of a hard disk drive system provided in the embodiment of the present disclosure may also be applied to the storage device shown in FIG. 2.

The method for controlling startup of a hard disk drive system includes:

latching the initialization states of all the hard disk drives after all hard disk drives are powered on; dividing all hard disk drives into two or more hard drive groups, each hard drive group includes more than one hard disk drive; and sequentially performing link initialization negotiation on each hard drive group by using a port protocol; and in an OOB negotiation process of the link initialization negotiation, by setting the state of an SCSI application layer power state machine, controlling a motor of each hard disk drive in the hard drive group to enter a spinning state.

Specifically, after the storage device is powered on, the power module in the storage device powers on the hard disk drive system 10, that is, all hard disk drives are powered on. After all hard disk drives are powered on, the initialization states of all the hard disk drives are latched. In an OOB negotiation process, there are various state machines, wherein an SCSI application layer power state machine (SCSI application layer power condition) is a state machine indicating the state of a hard disk drive, and the state of an SCSI application layer power state machine includes a Powered_On state, an Active state, an Idle state, a Standby state, a Stopped state, an Active_Wait state and an Idle_Wait state;

when the SCSI application layer power state machine is 0, it indicates that the state of the hard disk drive is a Powered_On state; when the SCSI application layer power state machine is 1, it indicates that the state of the hard disk drive is an Active state; when the SCSI application layer power state machine is 2, it indicates that the state of the hard disk drive is an Idle state; when the SCSI application layer power state machine is 3, it indicates that the state of the hard disk drive is a Standby state; when the SCSI application layer power state machine is 4, it indicates that the state of the hard disk drive is a Stopped state; when the SCSI application layer power state machine is 5, it indicates that the state of the hard disk drive is an Active_Wait state; and when the SCSI application layer power state machine is 6, it indicates that the state of the hard disk drive is an Idle_Wait state. For the storage device shown in FIG. 1, the state of the SCSI application layer power state machine is set to an Idle state by means of the firmware in the SAS port expansion chip 13, that is, the SCSI application layer power state machine is set to 2; For the storage device shown in FIG. 2, the state of the SCSI application layer power state machine is set to an Idle state by means of the firmware in the SAS port control chip 12, that is, the SCSI application layer power state machine is set to 2. After the initialization states of all hard disk drives are latched, each hard disk drive is powered on, but the motor in each hard disk drive is not spinning.

After initial states of all hard disk drives are latched, for the storage device shown in FIG. 1, all hard disk drives are divided into two or more hard drive groups by using firmware in the SAS port expansion chip 13; for the storage device shown in FIG. 2, all hard disk drives are divided into two or more hard drive groups by firmware in the SAS port control chip 12. Each hard drive group may be configured to include one hard disk drive, and may also be configured to include a plurality of hard disk drives. The number of mechanical hard disks in each hard drive group can be the same or different.

All hard disk drives may be divided according to actual requirements, which is not limited in the embodiment of the present disclosure. Taking the hard disk drive system 10 includes 36 hard disk drives as an example, 36 hard disk drives may be divided into 9 hard drive groups, and each hard drive group includes 4 hard disk drives.

After all the hard disk drives are divided into two or more hard drive groups, for hard disk drives with an SATA port, link initialization negotiation are sequentially performed on each hard drive group by using an SATA port protocol; for hard disk drives with an SAS port, link initialization negotiation are sequentially performed on each hard drive group by using an SAS port protocol. In an OOB negotiation process of the link initialization negotiation, by setting the state of an SCSI application layer power state machine, the state of the motor of each hard disk drive in a hard drive group on which link initialization negotiation are performing currently may be controlled. After the OOB negotiation is completed, a Speed negotiation is performed, and a Phyreset operation and a Link reset operation are completed in sequence, thereby completing link initialization negotiation.

Figure 3:
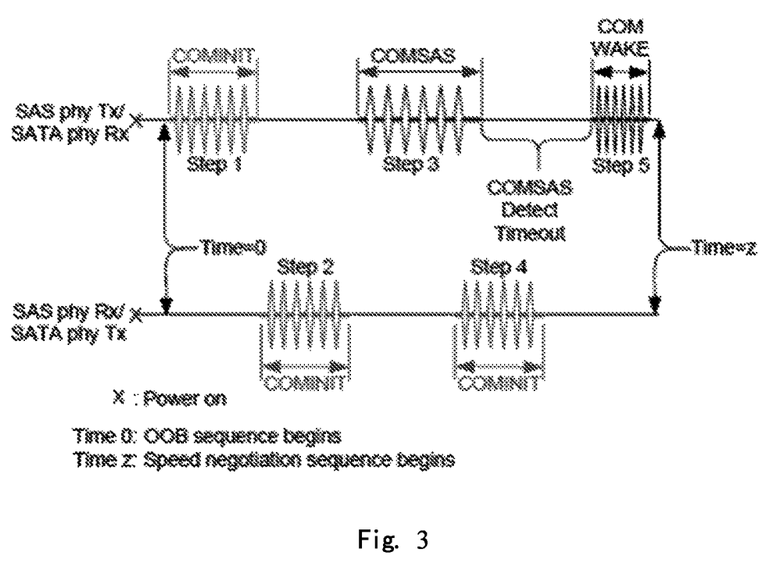
FIG. 3 is a schematic diagram of performing an OOB negotiation on a hard disk drive with an SATA port.

Taking the hard disk drive with an SATA port as an example, FIG. 3 is a schematic diagram of performing an OOB negotiation on a hard disk drive with an SATA port. The OOB negotiation includes: sending a first COMINIT signal to the hard drive group to receive a second COMINIT signal returned by the hard drive group; after receiving a second COMINIT signal returned by the hard drive group, sending a COMSAS signal to the hard drive group to receive a third COMINIT signal returned by the hard drive group; and after receiving a third COMINIT signal returned by the hard drive group or after a preset time, sending a COMWAKE signal to the hard drive group.

In the embodiments of the present disclosure, in an OOB negotiation process of the link initialization negotiation, by setting the state of an SCSI application layer power state machine, controlling a motor of each hard disk drive in the hard drive group to enter a spinning state includes: performing a first OOB negotiation on the hard drive group; after the first OOB negotiation ends, setting the state of the SCSI application layer power state machine as an Active state by means of the firmware in an SAS port control chip or an SAS port expansion chip; and performing a second OOB negotiation on the hard drive group. After all hard disk drives are powered on, the initialization states of all the hard disk drives are latched, and all the hard disk drives are in an Idle state, that is, the SCSI application layer power state machine is 2; therefore, after the first OOB negotiation ends, the hard drive group is still in an Idle state, and the first OOB negotiation is not successful. After the first OOB negotiation ends, the state of the SCSI application layer power state machine is set as an Active state by means of the firmware in an SAS port control chip or an SAS port expansion chip, that is, the SCSI application layer power state machine is set to 1; therefore, after the second OOB negotiation ends, the motor of each hard disk drive in the hard drive group may enter a spinning state.

The OOB negotiation process of the hard disk drives with an SAS port is similar to the OOB negotiation process of the hard disk drives with an SATA port, which is not described herein.

Figure 4:
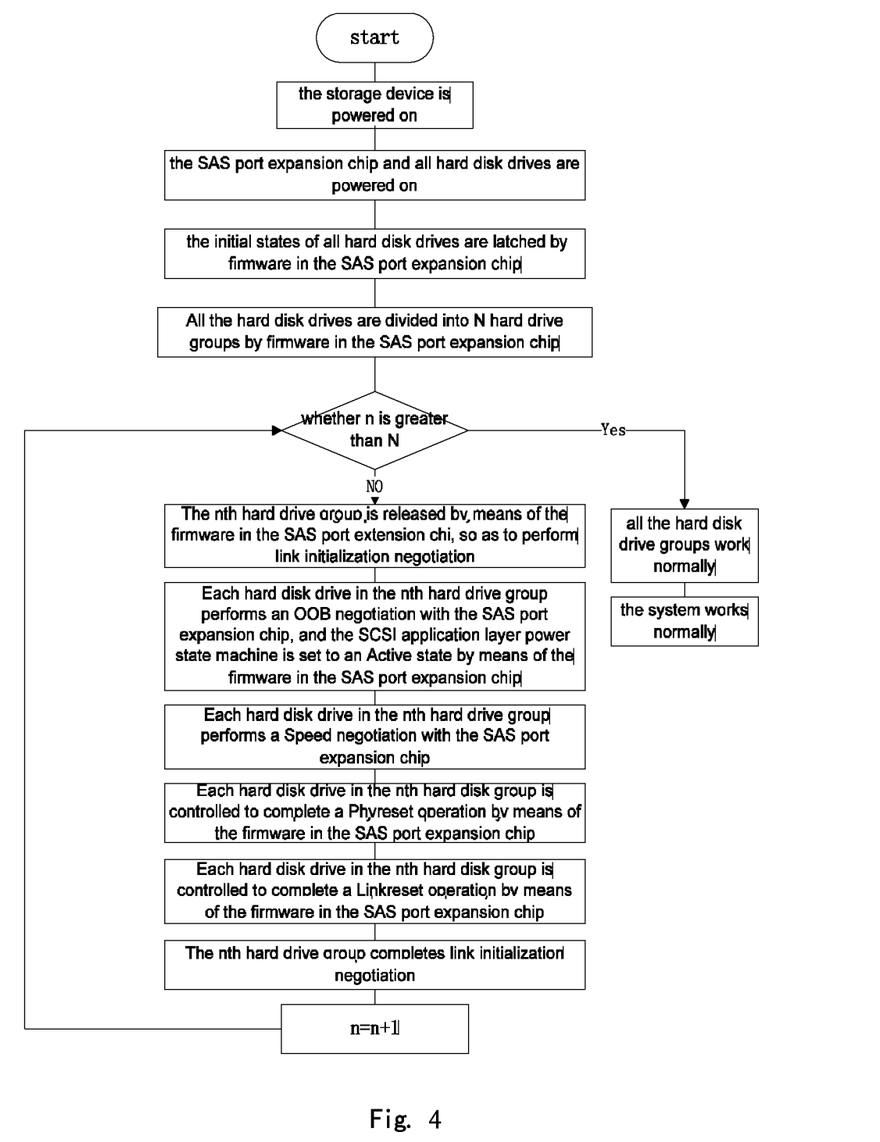
FIG. 4 is a flowchart of a method for controlling startup of a hard disk drive system according to an embodiment of the present disclosure.

Taking the storage device shown in FIG. 1 as an example, FIG. 4 is a flowchart of a method for controlling startup of a hard disk drive system, and the method for controlling startup of a hard disk drive system will be described in detail below with reference to FIG. 4.

After the storage device is powered on, the power module in the storage device powers on the CPU11, the SAS port control chip 12, the SAS port expansion chip 13 and the hard disk drive system 10, that is, all hard disk drives in the hard disk drive system 10 are powered on. After all hard disk drives are powered on, the initialization states of all hard disk drives are latched by means of firmware in the SAS port expansion chip 13, that is, all hard disk drives are set to an Idle state, that is, the SCSI application layer power state machine is set to 2. After the initialization states of all hard disk drives are latched, each hard disk drive is powered on, but the motor in each hard disk drive is not spinning. All the hard disk drives are divided into N hard drive groups by firmware in the SAS port expansion chip 13, where N is an integer not less than 2.

It should be noted that, when the method for controlling startup of a hard disk drive system according to the embodiment of the present disclosure is implemented by using a specific computer program, it may be determined, by determining whether the number n of times of performing link initialization negotiation is greater than N, whether the link initialization negotiation is completed for all the hard drive groups. The initial value of the number of times n the link initialization negotiation are performed is 1, and each time the link initialization negotiation is performed, 1 is added to the number of times n the link initialization negotiation are performed, and then it is determined whether the number of times n the link initialization negotiation is performed is greater than N. If the number n of times the link initialization negotiation is performed is greater than N, it is determined that the link initialization negotiation is completed on all the hard drive groups, and all the hard drive groups may work normally; otherwise, the link initialization negotiation is performed on a next hard drive group.

When the link initialization negotiation is performed on the nth hard drive group, the nth hard drive group is released by means of the firmware in the SAS port expansion chip 13. Each hard disk drive in the nth hard drive group performs an OOB negotiation with the SAS port expansion chip 13, and the nth hard drive group is set to an Active state by using the firmware in the SAS port expansion chip 13, that is, the SCSI application layer power state machine is set to 1, so as to control the motor of each hard disk drive in the nth hard drive group to enter a spinning state. After the OOB negotiation is completed, each hard disk drive in the nth hard drive group performs a Speed negotiation with the SAS port expansion chip 13. After the Speed negotiation is completed, each hard disk drive in the nth hard drive group is controlled to complete a Phy reset operation by means of the firmware in the SAS port expansion chip 13. After the Phy reset operation is completed, each hard disk drive in the nth hard drive group is controlled to complete a Link reset operation by means of the firmware in the SAS port expansion chip 13. After the Link reset operation is completed, the nth hard drive group completes link initialization negotiation.

According to the method for controlling startup of a hard disk drive system provided in the embodiments of the present disclosure, due to staggered start in batches of hard disk drives in the hard disk drive system 10, a power supply module with an appropriate load power can be selected, thereby reducing device cost. For example, for a 4U36 disk storage server, a power supply module with a load power of 800 W may be selected to replace a power supply module with a load power of 1200 W, which not only reduces system cost, but also improves conversion efficiency of a redundantly designed power supply module, thereby reducing the operation cost of a user. Furthermore, the method for controlling startup of a hard disk drive system provided in the embodiments of the present disclosure realizes, in a software manner, staggered power-on in batches of hard disk drives, without adding isolation devices such as an electric fuse or a transistor, thereby reducing the costs of a hard disk backplane. For example, if the hard disk drive system 10 includes 36 hard disk drives, the hard disk backplane has 36 hard disk slots, and each slot has two types of power supplies of 12 V and 5 V, two isolation devices may be eliminated from each slot, and 72 isolation devices may be eliminated from the hard disk drive system 10 altogether. Assuming that the cost of each isolation device is 2 Yuan, the cost of 144 Yuan may be saved in the embodiment of the present disclosure. Further, the isolation devices are not needed, reducing the failure rate of the hard disk backplane, thereby reducing the probability of replacement of a hard disk backplane, and also reducing the operation and maintenance cost.

Based on the same inventive concept, an embodiment of the present disclosure further provides an apparatus for controlling startup of a hard disk drive system, the hard disk drive system includes more than two hard disk drives. The apparatus for controlling startup of a hard disk drive system includes:

a latching module, configured to latch the initialization states of all the hard disk drives after all hard disk drives are powered on;

a grouping module, configured to divide all hard disk drives into two or more hard drive groups, each hard drive group includes more than one hard disk drive; and a negotiation module, configured to sequentially perform link initialization negotiation on each hard drive group by using a port protocol; and in an OOB negotiation process of the link initialization negotiation, by setting the state of an SCSI application layer power state machine, control a motor of each hard disk drive in the hard drive group to enter a spinning state.

In an optional implementation, the state of an SCSI application layer power state machine includes a Powered_On state, an Active state, an Idle state, a Standby state, a Stopped state, an Active_Wait state and an Idle_Wait state; the latching module sets the state of the SCSI application layer power state machine as an Idle state by means of the firmware in an SAS port control chip or an SAS port expansion chip.

In an optional implementation, the grouping module divides all hard disk drives into at least two hard drive groups by using firmware in the SAS port control chip or the SAS port expansion chip.

In an optional implementation, performing link initialization negotiation on each hard drive group includes:

sequentially performing an OOB negotiation, a Speed negotiation, a Phyreset operation and a Link reset operation on the hard drive group.

In an optional implementation, in an OOB negotiation process of the link initialization negotiation, by setting the state of a power state machine of a SCSI application layer, controlling a motor of each hard disk drive in the hard drive group to enter a spinning state includes:

performing a first OOB negotiation on the hard drive group;

after the first OOB negotiation ends, setting the state of the SCSI application layer power state machine as an Active state by means of the firmware in an SAS port control chip or an SAS port expansion chip; and performing a second OOB negotiation on the hard drive group;

wherein the OOB negotiation may comprise:

sending a first COMINIT signal to the hard drive group to receive a second COMINIT signal returned by the hard drive group;

after receiving a second COMINIT signal returned by the hard drive group, sending a COMSAS signal to the hard drive group to receive a third COMINIT signal returned by the hard drive group; and after receiving a third COMINIT signal returned by the hard drive group or after a preset time, sending a COMWAKE signal to the hard drive group.

Based on the same inventive concept, an embodiment of the present disclosure further provides a storage device, the storage device includes a CPU, an SAS port control chip and a hard disk drive system, the hard disk drive system includes two or more hard disk drives, and the SAS port control chip is configured to:

latch the initialization states of all the hard disk drives after all hard disk drives are powered on;

divide all hard disk drives into two or more hard drive groups, each hard drive group includes more than one hard disk drive; and sequentially perform link initialization negotiation on each hard drive group by using a port protocol; and in an OOB negotiation process of the link initialization negotiation, by setting the state of an SCSI application layer power state machine, control a motor of each hard disk drive in the hard drive group to enter a spinning state.

For the specific structure of the storage device, reference may be made to the description of FIG. 2 in the foregoing embodiment, and it will not be repeated herein again.

Based on the same inventive concept, an embodiment of the present disclosure further provides a storage device, the storage device includes a CPU, an SAS port control chip, an SAS port expansion chip and a hard disk drive system, the hard disk drive system includes two or more hard disk drives, wherein the SAS port expansion chip is configured to:

latch the initialization states of all the hard disk drives after all hard disk drives are powered on;

divide all hard disk drives into two or more hard drive groups, each hard drive group includes more than one hard disk drive; and sequentially perform link initialization negotiation on each hard drive group by using a port protocol; and in an OOB negotiation process of the link initialization negotiation, by setting the state of an SCSI application layer power state machine, control a motor of each hard disk drive in the hard drive group to enter a spinning state.

For the specific structure of the storage device, reference may be made to the description of FIG. 1 in the foregoing embodiment, and it will not be repeated herein again.

Based on the same inventive concept, an embodiment of the present disclosure further provides a computer readable storage medium, on which a computer program is stored. When the method for controlling startup of a hard disk drive system provided by the embodiment of the present disclosure is implemented in the form of a software functional unit and is sold or used as an independent product, it can be stored in a computer-readable storage medium. Based on such understanding, all or a part of procedures in the method for controlling startup of a hard disk drive system provided in the embodiments of the present disclosure may also be implemented by a computer program instructing relevant hardware, the computer program may be stored in a computer readable storage medium, and when the computer program is executed by a processor, the steps of the method for controlling startup of a hard disk drive system can be implemented. The computer program includes computer program codes, and the computer program codes may be in the form of source code, object code, executable file, or some intermediate forms. The computer-readable medium may include: any entity or device, medium, USB flash disk, removable hard disk, magnetic disk, optical disc, computer memory, read-only memory (ROM), random access memory (RAM), electrical carrier signal, telecommunications signal, software distribution medium, etc. that can carry the computer program code. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

The objectives, technical solutions, and beneficial effects of the present disclosure are described in details in the foregoing specific implementations. It should be understood that the foregoing descriptions are merely specific implementations of the present disclosure, but are not intended to limit the scope of protection of the present disclosure. Any modifications, equivalent replacements, improvements, etc. made within the spirit and principle of the present disclosure shall all fall within the scope of protection of the present disclosure.

What is claimed is:

1. A method for controlling startup of a hard disk drive system, the hard disk drive system comprises two or more hard disk drives, wherein the method comprising:
    latching the initialization states of all the hard disk drives after all hard disk drives are powered on;
    dividing all hard disk drives into two or more hard drive groups, each hard drive group comprises more than one hard disk drive; and
    sequentially performing link initialization negotiation on each hard drive group by using a port protocol; and in an Out-Of-Band (OOB) negotiation process of the link initialization negotiation, by setting the state of a Small Computer System Interface (SCSI) application layer power state machine, controlling a motor of each hard disk drive in the hard drive group to enter a spinning state.

2. The method for controlling startup of a hard disk drive system according to claim 1, wherein
    the state of an SCSI application layer power state machine comprises a Powered_On state, an Active state, an Idle state, a Standby state, a Stopped state, an Active_Wait state and an Idle_Wait state;
    latching the initialization states of all the hard disk drives comprises:
    setting the state of the SCSI application layer power state machine as an Idle state by means of the firmware in a Serial Attached SCSI (SAS) port control chip or an SAS port expansion chip.

3. The method for controlling startup of a hard disk drive system according to claim 2, wherein dividing all hard disk drives into two or more hard drive groups comprises:
    dividing all hard disk drives into at least two hard drive groups by using firmware in the SAS port control chip or the SAS port expansion chip.

4. The method for controlling startup of a hard disk drive system according to claim 2, wherein performing link initialization negotiation on each hard drive group comprises:
    sequentially performing an OOB negotiation, a Speed negotiation, a Phy reset operation and a Link reset operation on the hard drive group.

5. The method for controlling startup of a hard disk drive system according to claim 4, wherein
    in an OOB negotiation process of the link initialization negotiation, by setting the state of an SCSI application layer power state machine, controlling a motor of each hard disk drive in the hard drive group to enter a spinning state comprises:
    performing a first OOB negotiation on the hard drive group;
    after the first OOB negotiation ends, setting the state of the SCSI application layer power state machine as an Active state by means of the firmware in an SAS port control chip or an SAS port expansion chip; and
    performing a second OOB negotiation on the hard drive group;
    wherein the OOB negotiation may comprise:
    sending a first COMINIT signal to the hard drive group to receive a second COMINIT signal returned by the hard drive group;
    after receiving a second COMINIT signal returned by the hard drive group, sending a COMSAS signal to the hard drive group to receive a third COMINIT signal returned by the hard drive group; and
    after receiving a third COMINIT signal returned by the hard drive group or after a preset time, sending a COMWAKE signal to the hard drive group.

6. A storage device, comprising a Central Processing Unit (CPU), a Serial Attached SCSI (SAS) port control chip, and a hard disk drive system, wherein the hard disk drive system comprises two or more hard disk drives, and the SAS port control chip is configured to:
    latch the initialization states of all the hard disk drives after all hard disk drives are powered on;
    divide all hard disk drives into two or more hard drive groups, each hard drive group comprising more than one hard disk drive; and
    sequentially performing link initialization negotiation on each hard drive group by using a port protocol; and in an OOB negotiation process of the link initialization negotiation, by setting the state of an SCSI application layer power state machine, controlling a motor of each hard disk drive in the hard drive group to enter a spinning state.

7. A storage device, comprising a Central Processing Unit (CPU), a Serial Attached SCSI (SAS) port control chip, an SAS port expansion chip and a hard disk drive system, wherein the hard disk drive system comprises two or more hard disk drives, and the SAS port expansion chip is configured to:
    latching the initialization states of all the hard disk drives after all hard disk drives are powered on;
    divide all hard disk drives into two or more hard drive groups, each hard drive group comprising more than one hard disk drive; and
    sequentially performing link initialization negotiation on each hard drive group by using a port protocol; and in an Out-Of-Band (OOB) negotiation process of the link initialization negotiation, by setting the state of a Small Computer System Interface (SCSI) application layer power state machine, controlling a motor of each hard disk drive in the hard drive group to enter a spinning state.

8. The storage device according to claim 7, wherein the hard disk drive is a hard disk drive with a Serial Advanced Technology Attachment (SATA) port or an SAS port.

9. A non-transitory computer readable storage medium, wherein a computer program is stored on the non-transitory computer readable storage medium, and when the computer program is executed by a processor, cause the processor to implement the steps of the method for controlling startup of a hard disk drive system as claimed in claim 1.

10. The storage device according to claim 6, wherein the hard disk drive is a hard disk drive with a Serial Advanced Technology Attachment (SATA) port or an SAS port.

11. The storage device according to claim 6, wherein the CPU accesses the SAS port control chip through a Peripheral Component Interconnect Express (PCIe) bus, and the SAS port control chip reads and writes the hard disk drive through an SAS bus.

12. The storage device according to claim 6, wherein the number of hard disk drives in each hard drive group is the same or different.

13. The storage device according to claim 6, the state of an SCSI application layer power state machine comprises a Powered_On state, an Active state, an Idle state, a Standby state, a Stopped state, an Active_Wait state and an Idle_Wait state.

14. The storage device according to claim 13, wherein the SAS port control chip is further configured to set the state of the SCSI application layer power state machine as an Idle state through a firmware in the SAS port control chip.

15. The storage device according to claim 6, wherein the SAS port control chip is configured to divide all the hard disk drives into two or more hard drive groups through a firmware in the SAS port control chip.

16. The storage device according to claim 7, wherein the CPU accesses the SAS port control chip through a Peripheral Component Interconnect Express (PCIe) bus, and the SAS port control chip connects with the SAS port expansion chip through an SAS bus.

17. The storage device according to claim 16, wherein each SAS Phy port of the SAS port expansion chip connects with a hard disk drive.

18. The storage device according to claim 7, the state of an SCSI application layer power state machine comprises a Powered_On state, an Active state, an Idle state, a Standby state, a Stopped state, an Active_Wait state and an Idle_Wait state.

19. The storage device according to claim 18, wherein the SAS port expansion chip is configured to set the state of the SCSI application layer power state machine as an Idle state through a firmware in the SAS port expansion chip.

20. The storage device according to claim 7, wherein the SAS port expansion chip is configured to divide all the hard disk drives into two or more hard drive groups through a firmware in the SAS port expansion chip.

* * * * *